US012607983B2

(12) United States Patent　　　　　(10) Patent No.: US 12,607,983 B2
Tunks et al.　　　　　　　　　　　　　(45) Date of Patent:　　Apr. 21, 2026

(54) SYSTEMS AND METHODS FOR HEATING AND COOLING INFORMATION HANDLING SYSTEM WITH SERVER BLANK

(71) Applicant: Dell Products L.P., Round Rock, TX (US)

(72) Inventors: Eric Tunks, Austin, TX (US); Justin Broughton, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 18/313,691

(22) Filed: May 8, 2023

(65) Prior Publication Data

US 2024/0377809 A1　　　Nov. 14, 2024

(51) Int. Cl.
G05B 19/4155　　　　(2006.01)

(52) U.S. Cl.
CPC .................... G05B 19/4155 (2013.01); G05B 2219/49216 (2013.01)

(58) Field of Classification Search
None
See application file for complete search history.

(56) References Cited

U.S. PATENT DOCUMENTS

| | | | | |
|---|---|---|---|---|
| 7,826,216 B2 * | 11/2010 | Moss | ................ | H05K 7/20736 |
| | | | | 361/679.48 |
| 10,888,030 B1 * | 1/2021 | Kowalski | ........... | H05K 7/20745 |
| 2005/0168942 A1 * | 8/2005 | Steinbrecher | ...... | H05K 7/20209 |
| | | | | 312/236 |
| 2005/0237716 A1 * | 10/2005 | Chu | ................... | H05K 7/20736 |
| | | | | 361/696 |
| 2019/0327862 A1 * | 10/2019 | Bailey | ................ | H05K 7/20836 |
| 2020/0042056 A1 * | 2/2020 | Shabbir | ................. | G05B 15/02 |

* cited by examiner

*Primary Examiner* — David Earl Ogg
(74) *Attorney, Agent, or Firm* — Jackson Walker L.L.P.

(57)　　　　　ABSTRACT

A method may include operating an information handling system in a plurality of modes comprising at least: a recirculation heating mode in which a thermal control system enables a first air mover, a second air mover, and a heating element, causes a first gate to be in a first closed position, and causes a second gate to be in a second closed position such that air is continuously heated and recirculated between a first plenum and a second plenum; and an open loop mode in which the thermal control system enables the first air mover, disables the second air mover and the heating element, causes the first gate to be in a first open position, and causes the second gate to be in a second open position such that air is driven into the first plenum via the airflow inlet and out of the first plenum via the airflow exhaust.

15 Claims, 3 Drawing Sheets

SYSTEMS AND METHODS FOR HEATING AND COOLING INFORMATION HANDLING SYSTEM WITH SERVER BLANK

TECHNICAL FIELD

The present disclosure relates in general to information handling systems, and more particularly to cooling of information handling system components using a thermoelectric cooling apparatus, in conjunction with airflow-based cooling.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

A particular challenge in cooling information handling systems comes in the case of "edge computing," wherein an information handling system is located, often in a remote environment, in which its surrounding ambient temperature is not climate controlled, as might be the case of a cellular base station. In some instances, ambient temperatures may fluctuate considerably among seasons, meaning cooling requirements of an information handling system may change over time. For example, for hotter ambient temperatures, the information handling system may require significant cooling to maintain electronic components at desirable operating temperatures whereas for colder ambient temperatures, it may be required to heat electronic components of the information handling system to maintain their temperatures above minimum desired temperatures.

SUMMARY

In accordance with the teachings of the present disclosure, the disadvantages and problems associated with traditional approaches to heating and cooling information handling system components may be substantially reduced or eliminated.

In accordance with embodiments of the present disclosure, an information handling system may include a first plenum housing at least one information handling resource and having an airflow inlet and an airflow exhaust, a second plenum housing a heating element configured to transfer heat to air flowing proximate to the heating element, a first air mover in fluid communication with the first plenum and configured to drive flow of air proximate to the at least one information handling resource and through the first plenum, a second air mover in fluid communication with the second plenum and configured to drive flow of air proximate to the heating element, a first gate located proximate to the airflow inlet and translatable between a first closed position in which the first gate impedes airflow through the inlet into the first plenum and a first open position in which the first gate impedes airflow between the first plenum and the second plenum, a second gate located proximate to the airflow inlet and translatable between a second closed position in which the second gate impedes airflow through the inlet into the first plenum and a second open position in which the second gate impedes airflow between the first plenum and the second plenum, and a thermal control system configured to operate in a plurality of modes comprising at least: (a) a recirculation heating mode in which the thermal control system enables the first air mover, the second air mover, and the heating element, causes the first gate to be in the first closed position, and causes the second gate to be in the second closed position such that air is continuously heated and recirculated between the first plenum and the second plenum; and (b) an open loop mode in which the thermal control system enables the first air mover, disables the second air mover and the heating element, causes the first gate to be in the first open position, and causes the second gate to be in the second open position such that air is driven into the first plenum via the airflow inlet and out of the first plenum via the airflow exhaust.

In accordance with these and other embodiments of the present disclosure, a method is provided in an information handling system having a first plenum housing at least one information handling resource and having an airflow inlet and an airflow exhaust, a second plenum housing a heating element configured to transfer heat to air flowing proximate to the heating element, a first air mover in fluid communication with the first plenum and configured to drive flow of air proximate to the at least one information handling resource and through the first plenum, a second air mover in fluid communication with the second plenum and configured to drive flow of air proximate to the heating element, a first gate located proximate to the airflow inlet and translatable between a first closed position in which the first gate impedes airflow through the inlet into the first plenum and a first open position in which the first gate impedes airflow between the first plenum and the second plenum, and a second gate located proximate to the airflow inlet and translatable between a second closed position in which the second gate impedes airflow through the inlet into the first plenum and a second open position in which the second gate impedes airflow between the first plenum and the second plenum. The method may include operating the information handling system in a plurality of modes comprising at least: (a) a recirculation heating mode in which the thermal control system enables the first air mover, the second air mover, and the heating element, causes the first gate to be in the first closed position, and causes the second gate to be in the second closed position such that air is continuously heated and recirculated between the first plenum and the second plenum; and (b) an open loop mode in which the thermal control system enables the first air mover, disables the second air mover and the heating element, causes the first gate to be in the first open position, and causes the second gate to be in the second open position such that air is driven into the first plenum via the airflow inlet and out of the first plenum via the airflow exhaust.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in an information handling system having a first plenum housing at least one information handling resource and having an airflow inlet and an airflow exhaust, a second plenum housing a heating element configured to transfer heat to air flowing proximate to the heating element, a first air mover in fluid communication with the first plenum and configured to drive flow of air proximate to the at least one information handling resource and through the first plenum, a second air mover in fluid communication with the second plenum and configured to drive flow of air proximate to the heating element, a first gate located proximate to the airflow inlet and translatable between a first closed position in which the first gate impedes airflow through the inlet into the first plenum and a first open position in which the first gate impedes airflow between the first plenum and the second plenum, and a second gate located proximate to the airflow inlet and translatable between a second closed position in which the second gate impedes airflow through the inlet into the first plenum and a second open position in which the second gate impedes airflow between the first plenum and the second plenum, operate in a plurality of modes comprising at least: (a) a heating mode causing electrical voltage to be applied to a thermoelectric cooler in a manner such that heat is transferred from the thermoelectric cooler to first heat-rejecting media to heat the flow of air through the first plenum; and (b) a cooling mode causing electrical voltage to be applied to the thermoelectric cooler in a manner such that heat is transferred from the first heat-rejecting media to the thermoelectric cooler to cool the flow of air through the first plenum.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
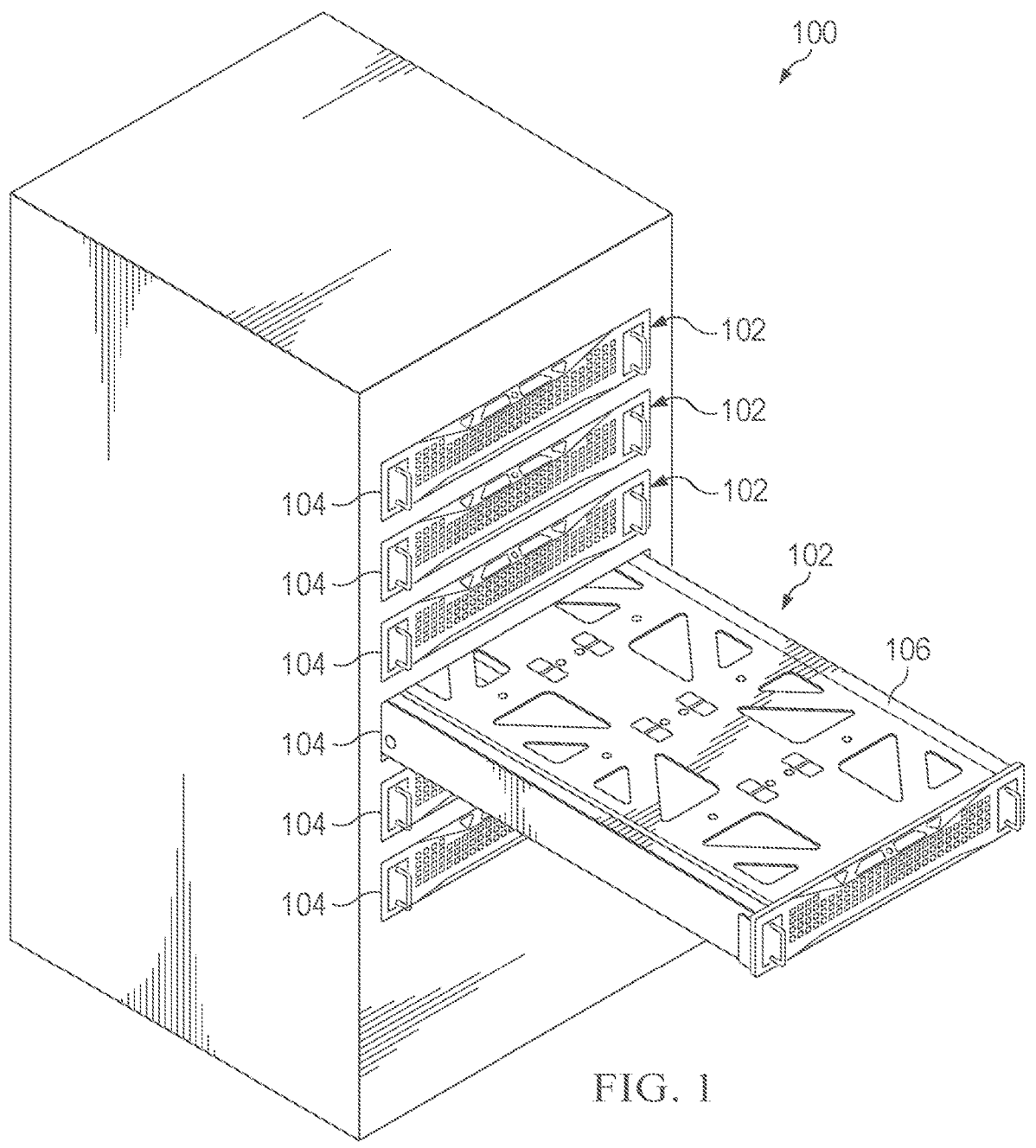
FIG. 1 illustrates a perspective view of selected components of a chassis for receiving modular information handling resources, in accordance with embodiments of the present disclosure.
Figure 2:
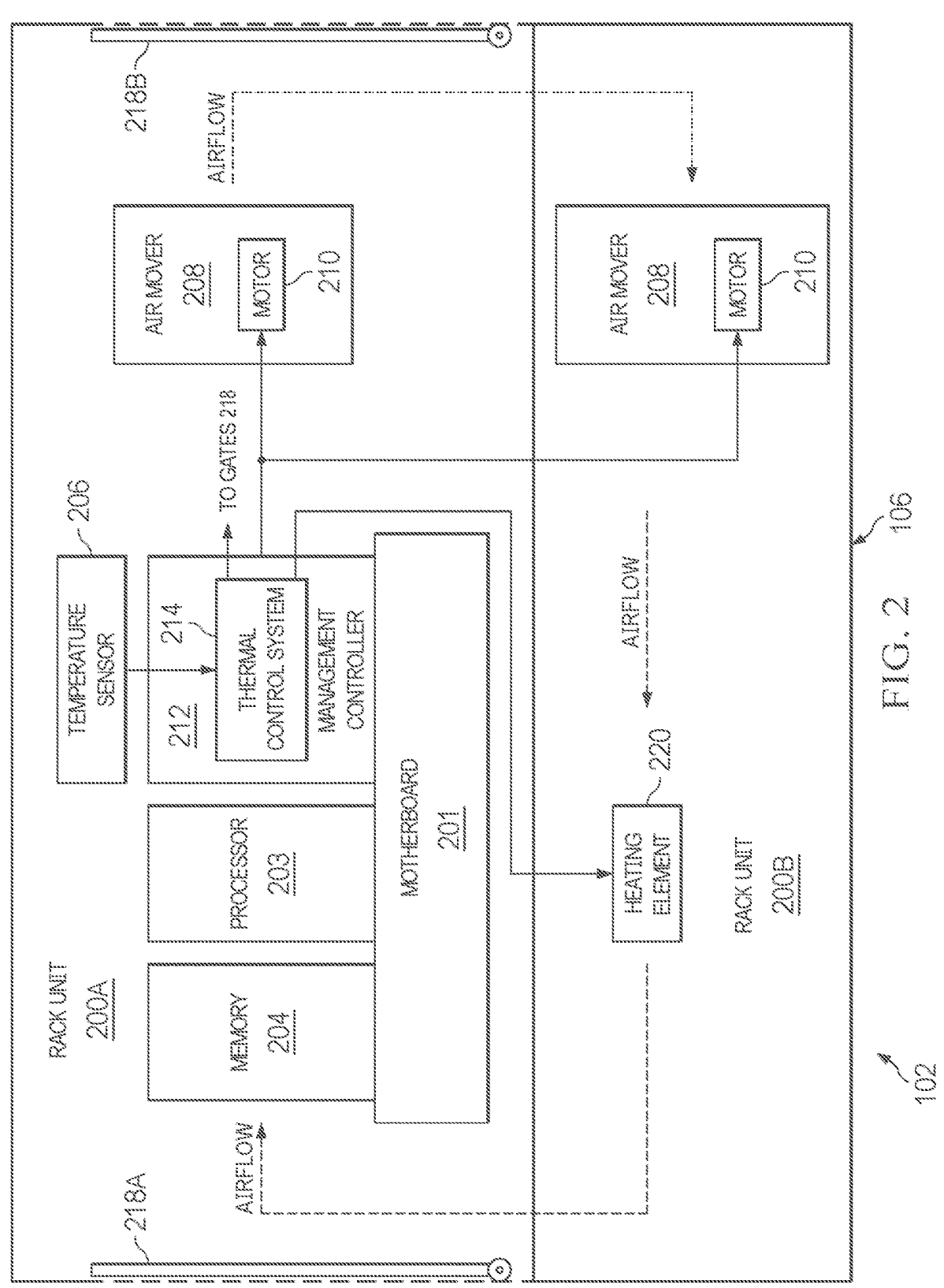
FIG. 2 illustrates a side elevation view of selected components of an example modular information handling system in a recirculation heating mode, in accordance with embodiments of the present disclosure.
Figure 3:
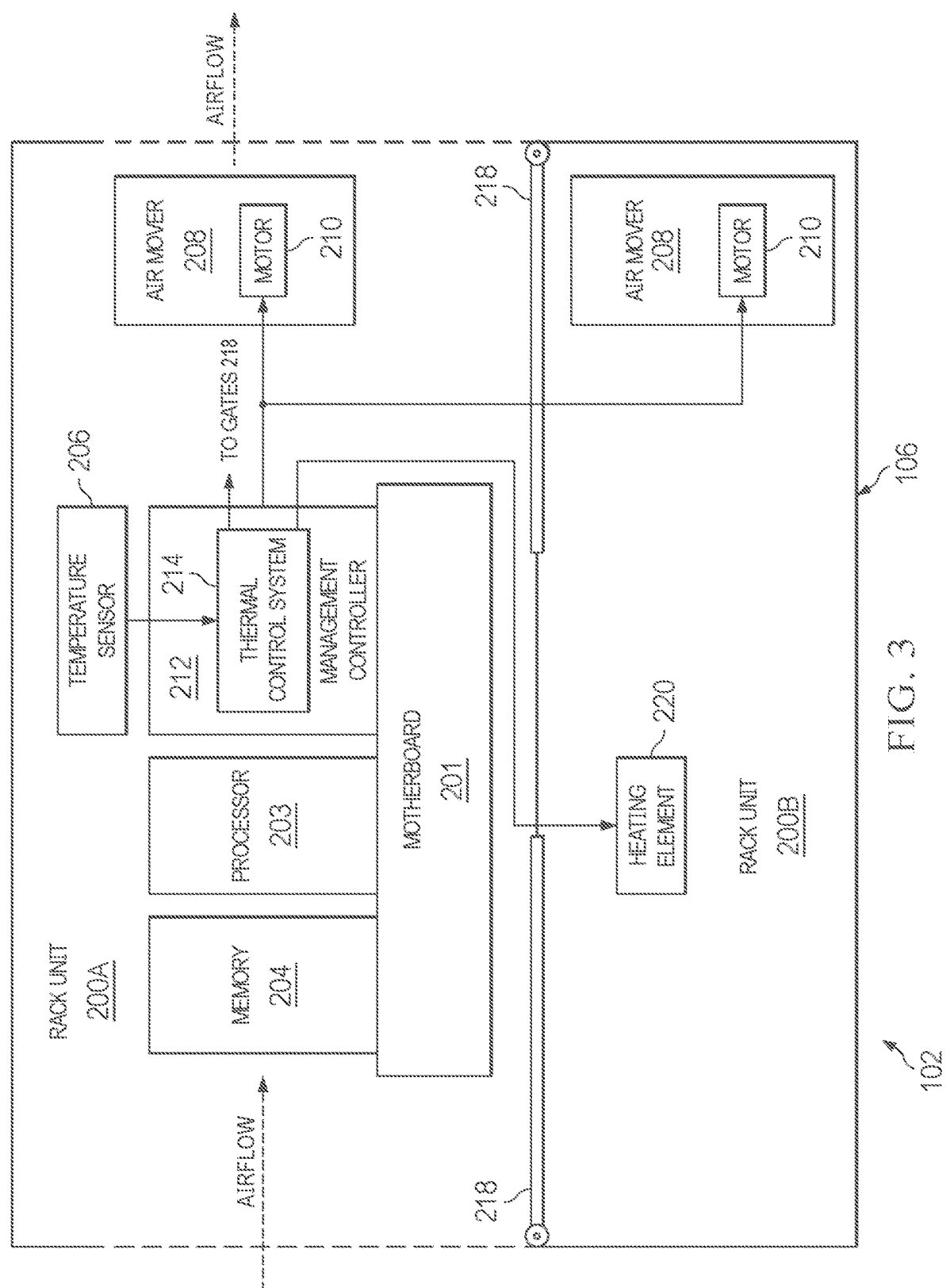
FIG. 3 illustrates a side elevation view of selected components of an example modular information handling system in an open loop mode, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

FIG. 1 illustrates a perspective view of selected components of a chassis 100 for receiving modular information handling resources, in accordance with embodiments of the present disclosure. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include a plurality of slots 104, each configured to receive a modular information handling system 102. Further as shown in FIG. 1, each information handling system 102 may include a housing 106 for housing the various components of information handling system 102.

FIG. 2 illustrates a side elevation view of selected components of an example modular information handling system 102 in a recirculation heating mode, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data.

As shown in FIG. 2, information handling system 102 may be implemented as a 2 rack unit or "2 U" server, with one rack unit 200A housing functional electronic server components of information handling system 102 and the other rack unit 200B comprising a substantially empty or "blank" plenum comprising an air mover 208 and a heating element 220.

As shown in FIG. 2, rack unit 200A may house a motherboard 201, a processor 203 mechanically and electrically coupled to motherboard 201, a memory 204 mechanically and electrically coupled to motherboard 201, a management controller 212 mechanically and electrically coupled to motherboard 201, a temperature sensor 206 communicatively coupled to management controller 212, an air mover 208, and gates 218. Rack unit 200B may house an air mover 208 and a heating element 220.

Motherboard 201 may comprise a circuit board configured to provide structural support for one or more information handling resources of information handling system 102 and/or electrically couple one or more of such information handling resources to each other and/or to other electric or electronic components external to information handling system 102.

Processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of information handling system 102.

Memory 204 may be communicatively coupled to processor 203 and may comprise any system, device, or apparatus operable to retain program instructions or data for a period of time. Memory 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 208 may include any mechanical or electro-mechanical system, apparatus, or device operable to move air and/or other gases in order to cool information handling resources of information handling system 102. In some embodiments, air mover 208 may comprise a fan (e.g., a rotating arrangement of vanes or blades which act on the air). In other embodiments, air mover 208 may comprise a blower (e.g., a centrifugal fan that employs rotating impellers to accelerate air received at its intake and change the direction of the airflow). In these and other embodiments, rotating and other moving components of air mover 208 may be driven by a motor 210. The rotational speed of motor 210 may be controlled by an air mover control signal communicated from thermal control system 214 of management controller 212. In operation, as described in greater detail below, air mover 208 may cool or heat information handling resources of information handling system 102 by drawing air into chassis 100 from outside chassis 100, expelling air from inside chassis 100 to the outside of chassis 100, and/or moving air across heat-rejecting media to cool or warm air flowing proximate to such heat-rejecting media.

Management controller 212 may comprise any system, device, or apparatus configured to facilitate management and/or control of information handling system 102 and/or one or more of its component information handling resources. Management controller 212 may be configured to issue commands and/or other signals to manage and/or control information handling system 102 and/or its information handling resources. Management controller 212 may comprise a microprocessor, microcontroller, DSP, ASIC, field programmable gate array ("FPGA"), EEPROM, or any combination thereof. Management controller 212 also may be configured to provide out-of-band management facilities for management of information handling system 102. Such management may be made by management controller 212 even if information handling system 102 is powered off or powered to a standby state. In certain embodiments, management controller 212 may include or may be an integral part of a baseboard management controller (BMC), a remote access controller (e.g., a Dell Remote Access Controller or Integrated Dell Remote Access Controller), or an enclosure controller. In other embodiments, management controller 212 may include or may be an integral part of a chassis management controller (CMC).

As shown in FIG. 2, management controller 212 may include a thermal control system 214. Thermal control system 214 may include any system, device, or apparatus configured to receive one or more signals indicative of one or more temperatures within information handling system 102 (e.g., one or more signals from one or more temperature sensors 206), and based on such signals, calculate an air mover driving signal to maintain an appropriate level of cooling/heating, increase cooling/heating, or decrease cooling/heating, as appropriate, and communicate such air mover driving signal to air movers 208. In addition to thermal-based control of speeds of air movers 208, thermal control system 214 may further be configured to regulate heating element 220 based on a temperature sensed by temperature sensor 206, such regulation including, without limitation, turning heating element 220 on or off, regulating power consumption of heating element 220, and/or regulating a temperature of heating element 220. Moreover, thermal control system 214 may further be configured to, as described in greater detail below, receive one or more signals indicative of one or more temperatures within information handling system 102 (e.g., one or more signals from one or more temperature sensors 206), and based on such signals, control one or more gates 218 to control flows of air through rack units 200B.

Temperature sensor 206 may be any system, device, or apparatus (e.g., a thermometer, thermistor, etc.) configured to communicate a signal to management controller 212 or another controller indicative of a temperature within information handling system 102. In many embodiments, information handling system 102 may comprise a plurality of temperature sensors 206, wherein each temperature sensor 206 detects a temperature of a particular component and/or location within information handling system 102. For example, in some embodiments a temperature sensor 206 may be located within, upon, or sufficiently proximate to motherboard 201 in order that any temperature measured by temperature sensor 206 is indicative of a temperature proximate to motherboard 201 and/or components mounted thereon.

A first gate 218A may be located proximate to an air inlet of rack unit 200A, and may comprise any suitable mechanical structure, system, device, or apparatus configured to selectively be positioned, based on one or more control signals communicated from thermal control system 214, at or between: (a) a closed position (e.g., as shown in FIG. 2) in which gate 218A substantially impedes flow of air through the inlet of rack unit 200A and substantially permits flow of air from rack unit 200B to rack unit 200A or (b) an open position (e.g., as shown in FIG. 3 described below) in which gate 218A substantially permits flow of air through the inlet of rack unit 200A and substantially impedes flow of air from rack unit 200B to rack unit 200A. Further, in some embodiments, gate 218A may be capable of one or more positions intermediate to its closed position and its open position.

Similarly, a second gate 218B may be located proximate to an air exhaust of rack unit 200A, and may comprise any suitable mechanical structure, system, device, or apparatus configured to selectively be positioned, based on one or more control signals communicated from thermal control system 214, at or between: (a) a closed position (e.g., as shown in FIG. 2) in which gate 218A substantially impedes flow of air through the exhaust of rack unit 200A and substantially permits flow of air from rack unit 200A to rack unit 200B or (b) an open position (e.g., as shown in FIG. 3 described below) in which gate 218B substantially permits flow of air through the exhaust of rack unit 200A and substantially impedes flow of air from rack unit 200A to rack unit 200B. Further, in some embodiments, gate 218B may be capable of one or more positions intermediate to its closed position and its open position.

Heating element 220 may comprise any suitable system, device, or apparatus configured to generate heat based on a control signal from thermal control system 214. For example, in some embodiments, heating element 220 may comprise a device configured to convert electrical energy into thermal energy, such as by conveying electrical current through one or more electrical resistors.

In the recirculation heating mode shown in FIG. 2, thermal control system 218 may also enable air movers 208 and heating element 220, such that airflow recirculates from rack unit 200A to rack unit 200B and back to rack unit 200A while being heated by heating element 220, in order to heat components of information handling system 102 present within rack unit 200A.

FIG. 3 illustrates a side elevation view of selected components of an example modular information handling system 102 in an open loop mode, in accordance with embodiments of the present disclosure. In the open loop mode shown in FIG. 3, thermal control system 214 may enable air mover 208 present in rack unit 200A, but disable air mover 208 present in rack unit 200B and disable heating element 220, such that little or no airflow exists in rack unit 200B and such that airflow flows in rack unit 200A from the inlet of rack unit 200A through the exhaust of rack unit 200A, in order to cool components of information handling system 102 present within rack unit 200A.

In operation, thermal control system 214 may selectively control air movers 208, gates 218, and heating element 220 in order to regulate a temperature within rack unit 200A. For example, while operating in the open loop mode of FIG. 3, thermal control system 214 may monitor a temperature sensed by temperature sensor 206 to determine if the temperature is below a threshold minimum temperature. If the temperature is below a threshold minimum temperature, thermal control system 214 may control air movers 208, gates 218, and heating element 220 in order to transition information handling system 102 to the heating recirculation mode of FIG. 2, thus heating components of rack unit 200A. Such operation in the heating recirculation mode may continue until the temperature measured by temperature sensor 206 reaches the minimum threshold temperature (plus any hysteresis offset), after which thermal control system 214 may control air movers 208, gates 218, and heating element 220 in order to transition information handling system 102 back to the open loop mode of FIG. 3.

In addition to motherboard 201, processor 203, memory 204, management controller 212, temperature sensor 206, air movers 208, gates 218, and heating element 220, information handling system 102 may include one or more other information handling resources.

Although the foregoing contemplates that rack units 200A and 200B respectively form a first plenum for electronic components and a second plenum that is substantially blank (other than air mover 208 and heating element 220), the creation of such plenums may be accomplished in any suitable manner. For example, in some embodiments, a slot 104 of chassis 100 may serve as the first plenum analogous to rack unit 200A and an adjacent slot 104 of chassis 100 may serve as the second plenum analogous to rack unit 200B.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:
a first plenum housing at least one information handling resource and having an airflow inlet and an airflow exhaust;
a second plenum housing a heating element configured to transfer heat to air flowing proximate to the heating element;
a first air mover in fluid communication with the first plenum and configured to drive flow of air proximate to the at least one information handling resource and through the first plenum;
a second air mover in fluid communication with the second plenum and configured to drive flow of air proximate to the heating element;
a first gate located proximate to the airflow inlet and translatable between a first closed position in which the first gate impedes airflow through the inlet into the first plenum and a first open position in which the first gate impedes airflow between the first plenum and the second plenum;
a second gate located proximate to the airflow inlet and translatable between a second closed position in which the second gate impedes airflow through the inlet into the first plenum and a second open position in which the second gate impedes airflow between the first plenum and the second plenum; and
a thermal control system configured to operate in a plurality of modes comprising at least:
a recirculation heating mode in which the thermal control system enables the first air mover, the second air mover, and the heating element, causes the first gate to be in the first closed position, and causes the second gate to be in the second closed position such that air is continuously heated and recirculated between the first plenum and the second plenum; and
an open loop mode in which the thermal control system enables the first air mover, disables the second air mover and the heating element, causes the first gate to be in the first open position, and causes the second gate to be in the second open position such that air is driven into the first plenum via the airflow inlet and out of the first plenum via the airflow exhaust.

2. The information handling system of claim 1, wherein:
the first plenum comprises a first rack unit of the information handling system; and
the second plenum comprises a second rack unit of the information handling system adjacent to the first rack unit.

3. The information handling system of claim 1, wherein:
the first plenum comprises a first slot of a chassis for housing a plurality of information handling systems; and
the second plenum comprises a second slot of the chassis adjacent to the first slot.

4. The information handling system of claim 1, further comprising a temperature sensor communicatively coupled to the thermal control system and configured to communicate a temperature signal to the thermal control system indicative of a temperature associated with the first plenum;
wherein the thermal control system is further configured to operate in the recirculation heating mode when the temperature is below a threshold temperature.

5. The information handling system of claim 1, further comprising a temperature sensor communicatively coupled to the thermal control system and configured to communicate a temperature signal to the thermal control system indicative of a temperature associated with the first plenum;
wherein the thermal control system is further configured to operate in the cooling mode when the temperature is above a threshold temperature.

6. A method, in an information handling system having a first plenum housing at least one information handling resource and having an airflow inlet and an airflow exhaust, a second plenum housing a heating element configured to transfer heat to air flowing proximate to the heating element, a first air mover in fluid communication with the first plenum and configured to drive flow of air proximate to the at least one information handling resource and through the first plenum, a second air mover in fluid communication with the second plenum and configured to drive flow of air proximate to the heating element, a first gate located proximate to the airflow inlet and translatable between a first closed position in which the first gate impedes airflow through the inlet into the first plenum and a first open position in which the first gate impedes airflow between the first plenum and the second plenum, and a second gate located proximate to the airflow inlet and translatable between a second closed position in which the second gate impedes airflow through the inlet into the first plenum and a second open position in which the second gate impedes airflow between the first plenum and the second plenum, the method comprising operating the information handling system in a plurality of modes comprising at least:
a recirculation heating mode in which the thermal control system enables the first air mover, the second air mover, and the heating element, causes the first gate to be in the first closed position, and causes the second gate to be in the second closed position such that air is continuously heated and recirculated between the first plenum and the second plenum; and
an open loop mode in which the thermal control system enables the first air mover, disables the second air mover and the heating element, causes the first gate to be in the first open position, and causes the second gate to be in the second open position such that air is driven into the first plenum via the airflow inlet and out of the first plenum via the airflow exhaust.

7. The method of claim 6, wherein:

the first plenum comprises a first rack unit of the information handling system; and the second plenum comprises a second rack unit of the information handling system adjacent to the first rack unit.

8. The method of claim 6, wherein:

the first plenum comprises a first slot of a chassis for housing a plurality of information handling systems; and the second plenum comprises a second slot of the chassis adjacent to the first slot.

9. The method of claim 6, further comprising a temperature sensor communicatively coupled to the thermal control system and configured to communicate a temperature signal to the thermal control system indicative of a temperature associated with the first plenum;

wherein the method further comprises operating in the recirculation heating mode when the temperature is below a threshold temperature.

10. The method of claim 6, further comprising a temperature sensor communicatively coupled to the thermal control system and configured to communicate a temperature signal to the thermal control system indicative of a temperature associated with the first plenum;

wherein the method further comprises operating in the cooling mode when the temperature is above a threshold temperature.

11. An article of manufacture, comprising;

a non-transitory computer readable medium; and computer-executable instructions carried on the computer readable medium, the instructions readable by a processor, the instructions, when read and executed, for causing the processor to, in an information handling system having a first plenum housing at least one information handling resource and having an airflow inlet and an airflow exhaust, a second plenum housing a heating element configured to transfer heat to air flowing proximate to the heating element, a first air mover in fluid communication with the first plenum and configured to drive flow of air proximate to the at least one information handling resource and through the first plenum, a second air mover in fluid communication with the second plenum and configured to drive flow of air proximate to the heating element, a first gate located proximate to the airflow inlet and translatable between a first closed position in which the first gate impedes airflow through the inlet into the first plenum and a first open position in which the first gate impedes airflow between the first plenum and the second plenum, and a second gate located proximate to the airflow inlet and translatable between a second closed position in which the second gate impedes airflow through the inlet into the first plenum and a second open position in which the second gate impedes airflow between the first plenum and the second plenum:

operate in a plurality of modes comprising at least:

a heating mode causing electrical voltage to be applied to a thermoelectric cooler in a manner such that heat is transferred from the thermoelectric cooler to first heat-rejecting media to heat the flow of air through the first plenum; and a cooling mode causing electrical voltage to be applied to the thermoelectric cooler in a manner such that heat is transferred from the first heat-rejecting media to the thermoelectric cooler to cool the flow of air through the first plenum.

12. The article of claim 11, wherein:

the first plenum comprises a first rack unit of the information handling system; and the second plenum comprises a second rack unit of the information handling system adjacent to the first rack unit.

13. The article of claim 11 wherein:

the first plenum comprises a first slot of a chassis for housing a plurality of information handling systems; and the second plenum comprises a second slot of the chassis adjacent to the first slot.

14. The article of claim 11, the instructions for further causing operation in a heating recirculation mode when a temperature associated with the first plenum is below a threshold temperature.

15. The article of claim 11, the instructions for further causing operation in an open loop mode when a temperature associated with the first plenum is above a threshold temperature.

\* \* \* \* \*